July 31, 1951 — E. RHEINFRANK — 2,562,210

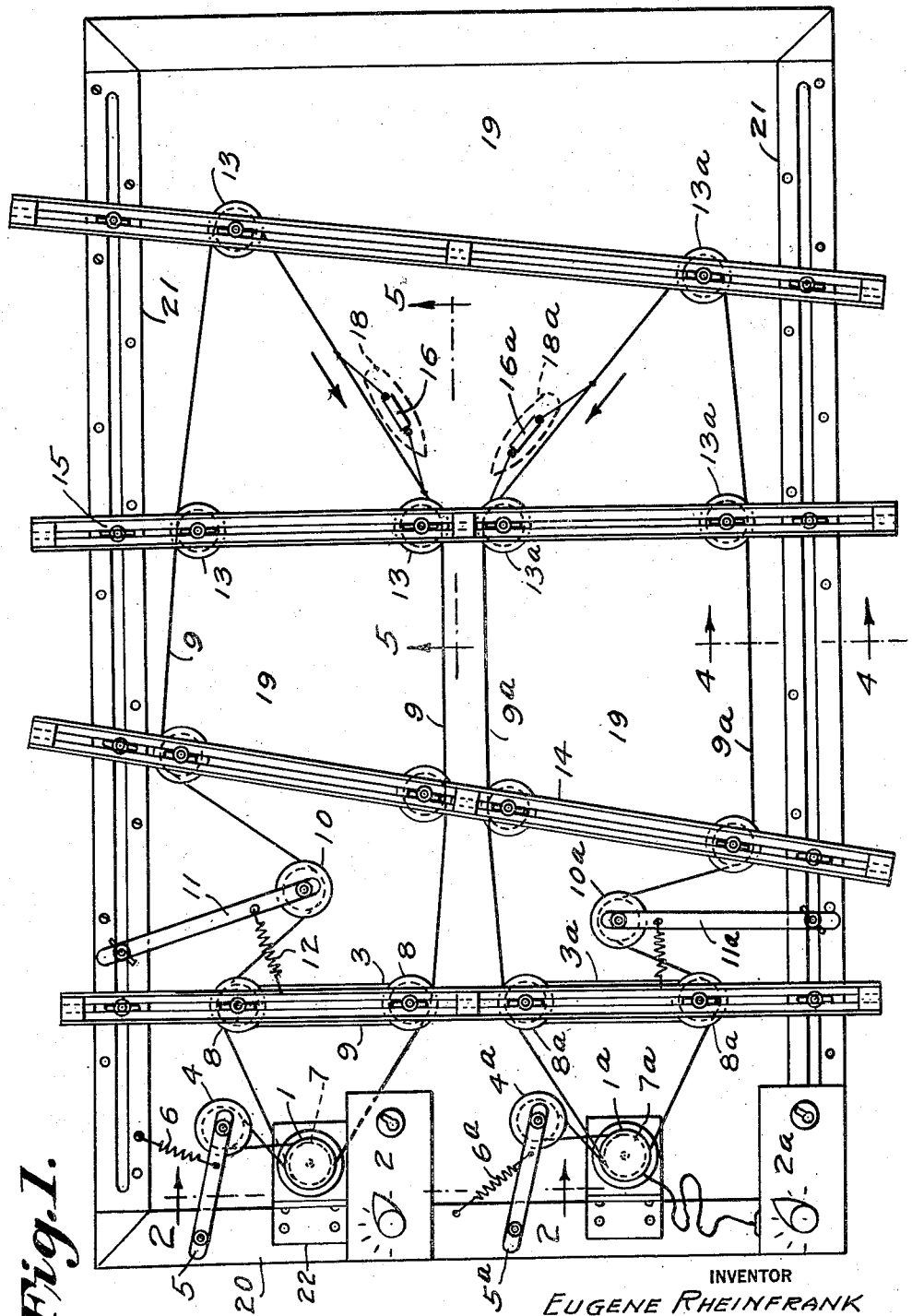

DEMONSTRATOR

Filed Feb. 8, 1950 — 2 Sheets-Sheet 2

INVENTOR
EUGENE RHEINFRANK
BY
H. L. Godfrey
ATTORNEY

Patented July 31, 1951

2,562,210

UNITED STATES PATENT OFFICE 2,562,210

DEMONSTRATOR

Eugene Rheinfrank, New York, N. Y.

Application February 8, 1950, Serial No. 143,099

1 Claim. (Cl. 35—49)

(Granted under the act of March 3, 1883, as amended April 30, 1928; 370 O. G. 757)

The invention described herein may be manufactured and used by or for the Government of the United States for governmental purposes without the payment to me of any royalty thereon in accordance with the provisions of the act of April 30, 1928 (ch. 460, 45 Stat. L. 467).

This application is a continuation-in-part of my prior application Serial No. 85,011, now abandoned, filed April 1, 1949, and is also related to my copending application Serial No. 158,877, filed April 28, 1950, which is also a continuation-in-part of application Serial No. 85,011.

This invention is an innovation in the means of illustrating and demonstrating on the face of a screen the relative movements of vessels, motor-vehicles, airplanes and other objects by the use of small models driven or moved by a concealed apparatus or mechanism.

Primarily, it comprises a new combination of parts and elements so constructed and combined on the back of the screen as to move the models in any direction and at any desired rate of speed; to accurately demonstrate and reproduce in court, in the class-room and elsewhere the relative movements, speed, maneuvering space and courses of vessels, motor-vehicles and other moving objects when they approach and pass or come into collision with other vessels, motor-vehicles, or moving or stationary objects, on water, on land or in the air.

Heretofore, lawyers have tried admiralty and automobile collision cases with the aid of small models pushed around on the trial table by hand. That method of demonstrating collisions although in some degree helpful to the court has not been satisfactory or adequate because neither the speed, nor the time consumed during the approach, nor the maneuvering space available to each of the colliding vessels or motor vehicles, nor the respective courses could be accurately demonstrated or illustrated. Now, by the aid of this new invention, the courts will be able to determine with reasonable accuracy the speed, time, maneuvering space, and respective courses which are controlling factors in the fixing of blame for damages in collision cases.

Also, this invention will be of substantial help in the classroom of naval academies and other institutions of learning where the art and science of navigation are taught. There the device will be called or known as the "trainer" instead of the demonstrator. The application of every rule and regulation governing navigation can be illustrated by use of this device and every situation can be demonstrated. As an aid to naval students in studying maneuvers its value is obvious. Prior to this time, students have been taught navigation partly by illustration on the blackboard and by the use of pictures projected on a screen. One of the objects of this invention is to furnish a new method of teaching navigation that will be more practical and produce far better training than the methods now in use.

Another object of the invention is to provide the means for dramatic illustration in the public and private schools of the ways in which children are frequently injured or killed by motor-vehicles while crossing the streets and highways, thereby impressing them with the constant need for care and caution more effectively than can be done by oral admonitions, or by pictures.

Another object of the invention is to furnish entertainment, amusement and instruction by causing toys and models of persons, animals and objects of various kinds to move about on the face of the screen.

The objects and uses of this invention hereinbefore mentioned are not intended to exclude other objects and uses, it being understood that changes in the form, size, proportions and minor details may be made without interference with or sacrifice of the general plan or method of construction and combination of functioning members of the invention. Further objects, advantages and uses will be apparent when reading the description which follows and the drawings which are part hereof.

Figure 1 is a general plan view of one illustrative set-up to show the construction of the device.

Figure 3:
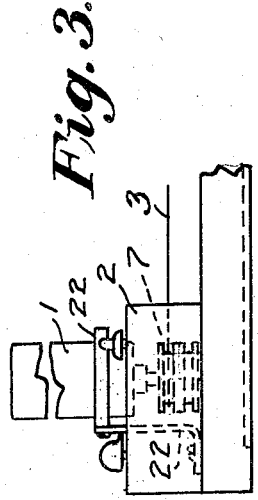
Figure 3 is a detail, shown in elevation, of the combination of the motor 1 with rheostat, resistor, transformer, and reverse lever which are in the reference character 2.
Figure 5:
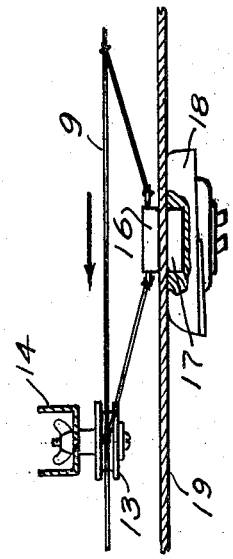
Figure 4:
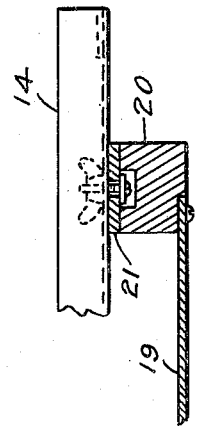

Figure 4 is an enlarged elevation on the line 4—4 of Figure 1, showing the manner in which the ends of the movable cross-bar supports 14 for the pulley wheels 13 are attached to the frame socket 21 by adjustable bolts and wing nuts;

Figure 5 is an enlarged elevation on the line 5—5 of Figure 1, showing the relative positions of the driving belt 9 riding the pulley 13, a cross-section of the adjustable cross-bars 14, the magnet 16 on the back of the screen together with its attachments to the belt 9; also the magnet 17 on the face of the screen attached to the base or bottom of the model of the vessel 18, motor-vehicle, or other object used in the demonstration.

Further referring in detail to the drawings, Figure 1 illustrates one of the innumerable arrangements or set-ups of the members comprising the device:

A frame 20, which is about 40" x 20", is built preferably of wood, and with any desired dimensions. On the front or outer side of this frame a screen 19 is attached, made of card-board, paper pasteboard, cloth, tracing cloth, aluminum, Bakelite, thin glass, or other suitable, non-magnetic material. The screen is stretched tightly across the frame 20 so that the surface upon which the magnets and models move may be smooth, flat and inflexible. The frame 20 when the demonstrator is in use is mounted on an easel or placed horizontally on a table or on wooden horses. The upper and lower sides of the frame 20 have grooves approximately ⅛" in depth and ⅜" width. Overlapping the edges of these grooves are strips 21 of Bakelite or metal fastened in such manner as to form a slot in and along which a plurality of cross-bars 14 can be quickly moved and readjusted to any desired position. These cross-bars 14 are U-shaped beams upon which a plurality of pulley wheels 13 and 13a are mounted for supporting driving belts 9 and 9a in a slot in such manner that said pulley wheels can be quickly moved and readjusted along the cross-bars to any desired fixed position. The cross-bars 14 are made of any non-magnetic metal, preferably of aluminum, because of its lightness and rigidity. The number of cross-bars of the pulley wheels mounted thereon is determined by the number and direction of the courses upon which it is desired to have the models move, a curved course necessarily requiring more pulley wheels and crossbars than would be needed for a straight course.

Figure 2:
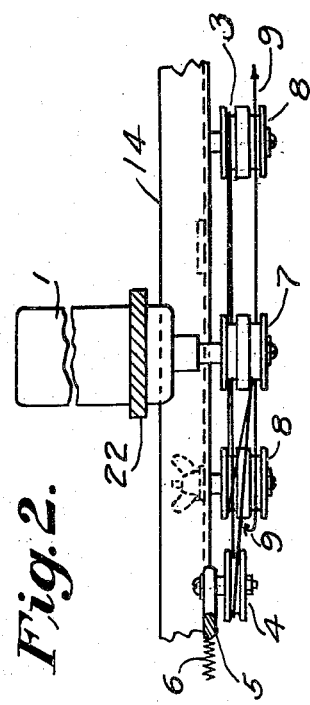
Figure 2 is an enlarged section on the line 2—2 of Figure 1.

The driving belts (3, 3a and 9 and 9a) are made of dial cord, waxed cord, string or other suitable material, waxed or otherwise treated to insure a maximum of friction and a minimum of slippage when in contact with the pulley wheels 8 and 8a and drive pulleys 7 and 7a mounted on the shaft of motors 1 and 1a. The driving belt 9 is operated either directly or indirectly by the motor 1, the indirect method being illustrated in Figure 1 and Figure 2. The apparatus shown in Figure 1 driving the driving belt 9 consists of the motor 1 fastened to the frame 20 by a bracket 22; a control box 2 contains a rheostat which regulates the motor's speed, also a resistor, and a transformer, which makes possible the use of direct or alternating electric current, and a reverse lever which regulates the movement of the models forward or backward; the driving belt 3 which runs from the pulley 7 on the motor 1 only to and from the two double-grooved pulley wheels 8 which also carry and operate the driving belt 9; (or the separate driving belt 3 and the two double pulley wheels may be omitted in which case the driving belt 9 is connected with and runs directly from the pulley 7 on the motor 1 and is driven directly therefrom). The apparatus also includes a slack take up idler pulley wheel 4 to prevent slippage of the belt 3 operating on the motor pulley wheels; an idler pulley arm 5 and the coil spring 6 which function to maintain steady and continuous tension on the driving belts 3 and/or 9 and help to prevent slippage thereof on the pulley wheels; a pulley wheel 10, and a second slack eliminating arm 11 and a coil spring 12 functioning together and adjustable to any position, for regulating belt tension and for compensating against any change in tension that might arise from a knot or twist in the belt or from any unevenness in the operation of any moving member or part. As shown in Figure 1, the belt 9a is driven in the same manner as described for belt 9, utilizing the respective duplicated parts as indicated by the figure numbers.

A flat permanent magnet 16 about ⅛" in thickness is fastened to the driving belt 9 by the use of leaders made of thread, thin wire or cord. The leaders from the magnet 16 to the driving belt 9 are glued or otherwise fastened to the top and ends of the magnet and are of such length that the magnet will pass and clear the pulley wheel, that is, pass between the bottom of the pulley wheel and the back surface of the screen 19. By placing the driving belt 9 about one half inch from the surface of the screen and having the leaders to the magnet the proper length, the leader at the forward or pulling end of the magnet will easily trip off the edge of the pulley wheels 8 and 13, and the belt 9 can thus be operated at turn of the belt and at changes in direction or course without entanglement of the leaders with the pulley wheels. Magnet 16a is carried by belt 9a in the same manner as magnet 16, and performs the same function in the movement of model 18a as magnet 16 does with regard to model 18.

It may be seen from the arrangement of elements in Figure 1 that the belts 9 and 9a may be adjusted in order to form converging courses for the models 18 and 18a. In such an arrangement the motors 1 and 1a may be run at a speed to simulate the speeds of the vehicles involved in a collision to be demonstrated. It is possible therefore to demonstrate the exact relative speeds and relative converging courses of the vehicles prior and up to the time of their collision. It will be noted that the courses and speeds of the vehicles prior and up to the time of collision are desired to be shown and hence there is no need for the paths of the vehicles to meet except at the point of collision.

A functioning member which is not included in the drawings consists of a compass rose, mounted on the face of the screen or front of the frame, around the center or axis of which is rotated by hand a combination pointer and ruler, the objects of the device being to determine and indicate the headings of the models as they move on their respective courses and to measure the distances between points along said courses. By the use of pencil marks placed upon the map, chart, drawing or painting and spaced along the courses taken by the models, the position of each ship, motor-vehicle or airplane can be illustrated as it was at each minute prior to the instant of the collision, the distance apart at which said marks are placed along the course being determined by the proven rate of speed per minute at which the vessel, motor-vehicle or airplane travelling that course was moving.

I claim:

A device for simulating a collision of a plurality of vehicles comprising a frame member, a slot extending along each of the opposite longitudinal sides of said frame, a plurality of slotted crossbars extending across the frame from one longitudinal side to the other, means slideable in said frame slots for adjustably securing said crossbars across said frame, a plurality of grooved pulley wheels carried by and adjustable along the slots of each of said crossbars, a plurality of tensioning arms secured to said frame, each arm carrying a grooved pulley and having a spring connecting it to another place on the frame, a plurality of motors attached to said frame, speed control means attached to each motor, a drive pulley connected to the shaft of each motor, a plurality of endless belts, each belt defining a closed circuit by passing over a plurality of grooved pulley wheels carried by said crossbars and over one of said drive pulleys and over a pulley wheel carried by said tensioning arm whereby the tensioning arm pulley will eliminate slack from said belt, a plurality of magnets each attached to one of said endless belts by means of two opposed filaments, a non-magnetic sheet extending across and bounded by the perimeter of said frame, a map on the upper surface of said sheet, and a plurality of vehicle models having magnets embedded therein and adapted to ride on said surface, whereby a plurality of the grooved pulley wheels carried by the adjustable cross arms may be set to arrange each endless belt in a course to be simulated which courses do not cross but converge at the point of collision to be simulated, the motors may be run at the speed to be simulated and hence the moving magnets attached to the endless belts will move the models on the map surface to simulate the courses and speeds of the vehicles prior to and up to the point of their collision.

EUGENE RHEINFRANK.

REFERENCES CITED

The following references are of record in the file of this patent:

UNITED STATES PATENTS

| Number | Name | Date |
|---|---|---|
| 2,239,395 | Mallory | Apr. 22, 1941 |
| 2,400,149 | Immerman | May 14, 1946 |
| 2,486,273 | Gibson | Oct. 25, 1949 |

FOREIGN PATENTS

| Number | Country | Date |
|---|---|---|
| 137,708 | Austria | May 25, 1934 |
| 449,781 | Great Britain | July 3, 1936 |